March 13, 1956 V. FINSTON 2,738,321
APPARATUS FOR AUTOMATICALLY CONVEYING
AND IMMERSING ARTICLES
Filed Aug. 26, 1950 8 Sheets-Sheet 5

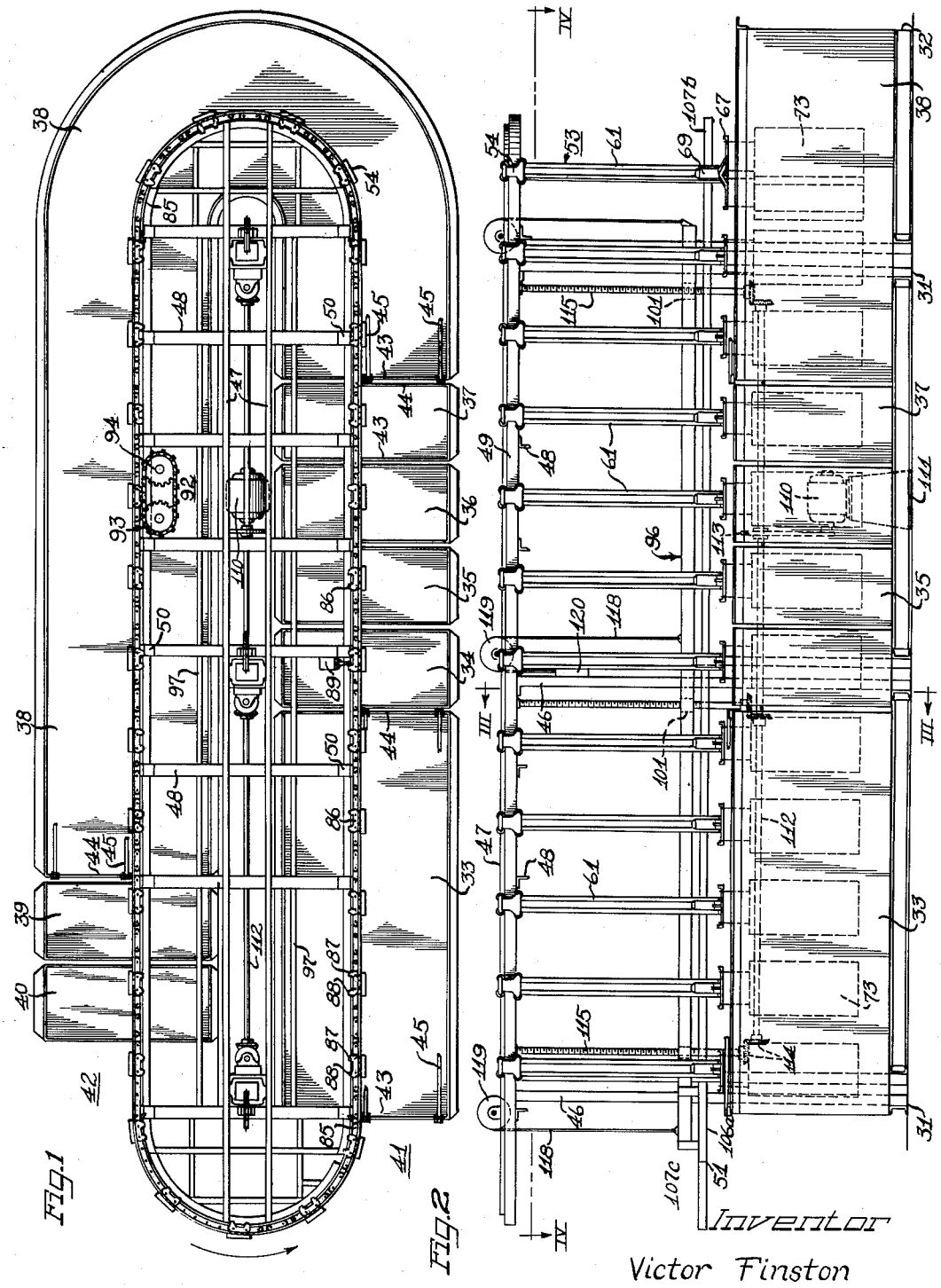

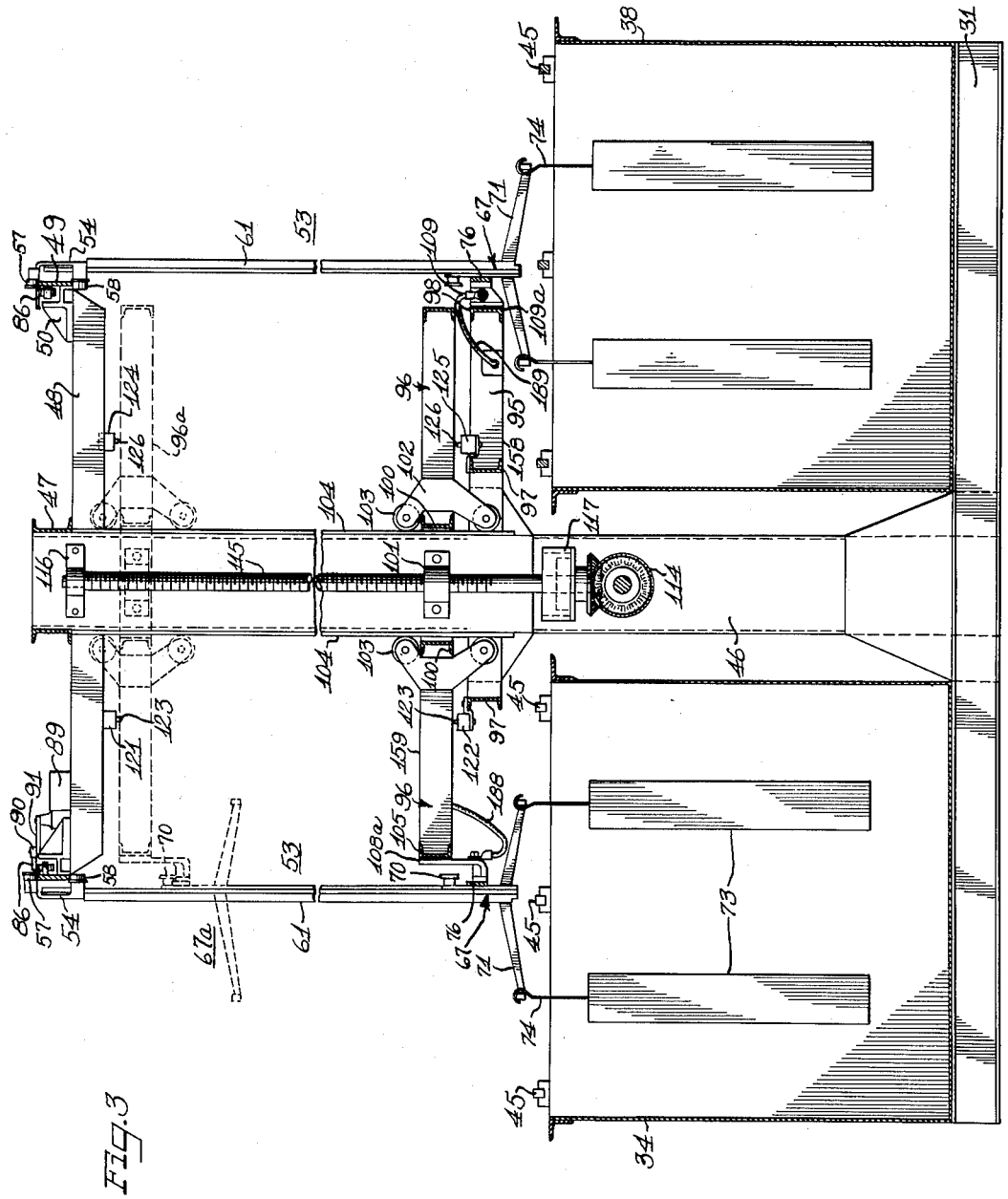

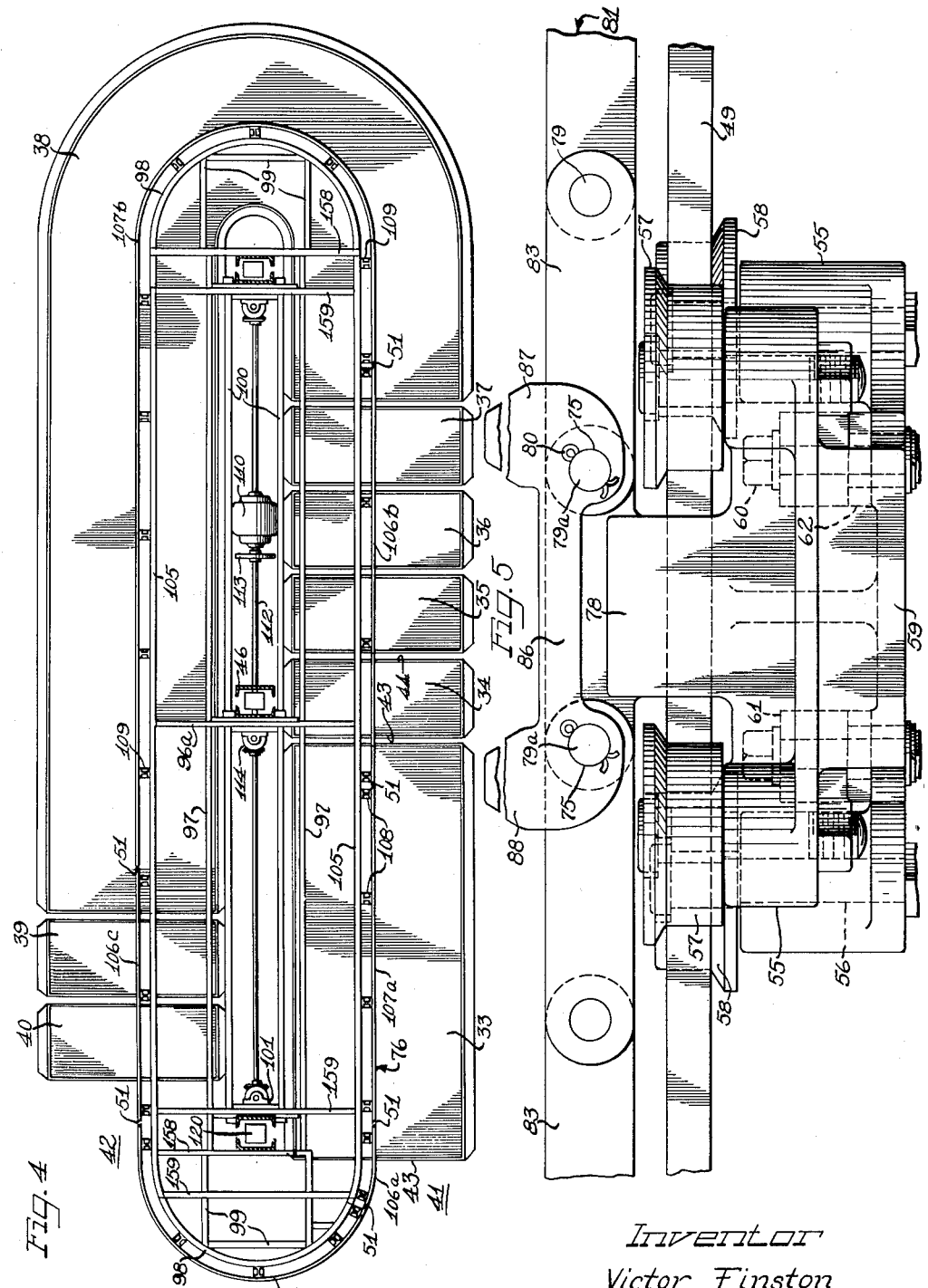

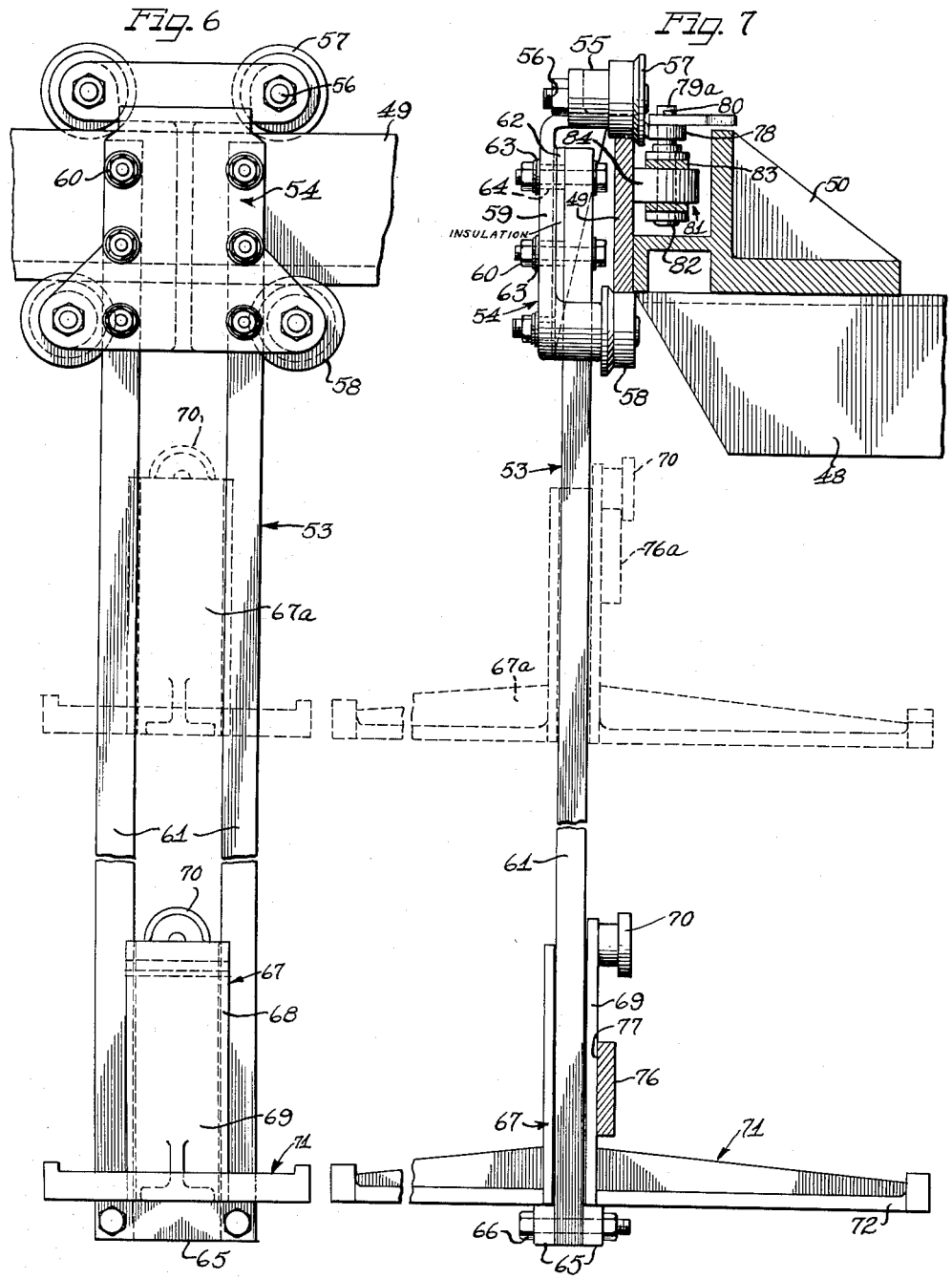

Inventor
Victor Finston
By The firm of Charles A. Wills
Attys.

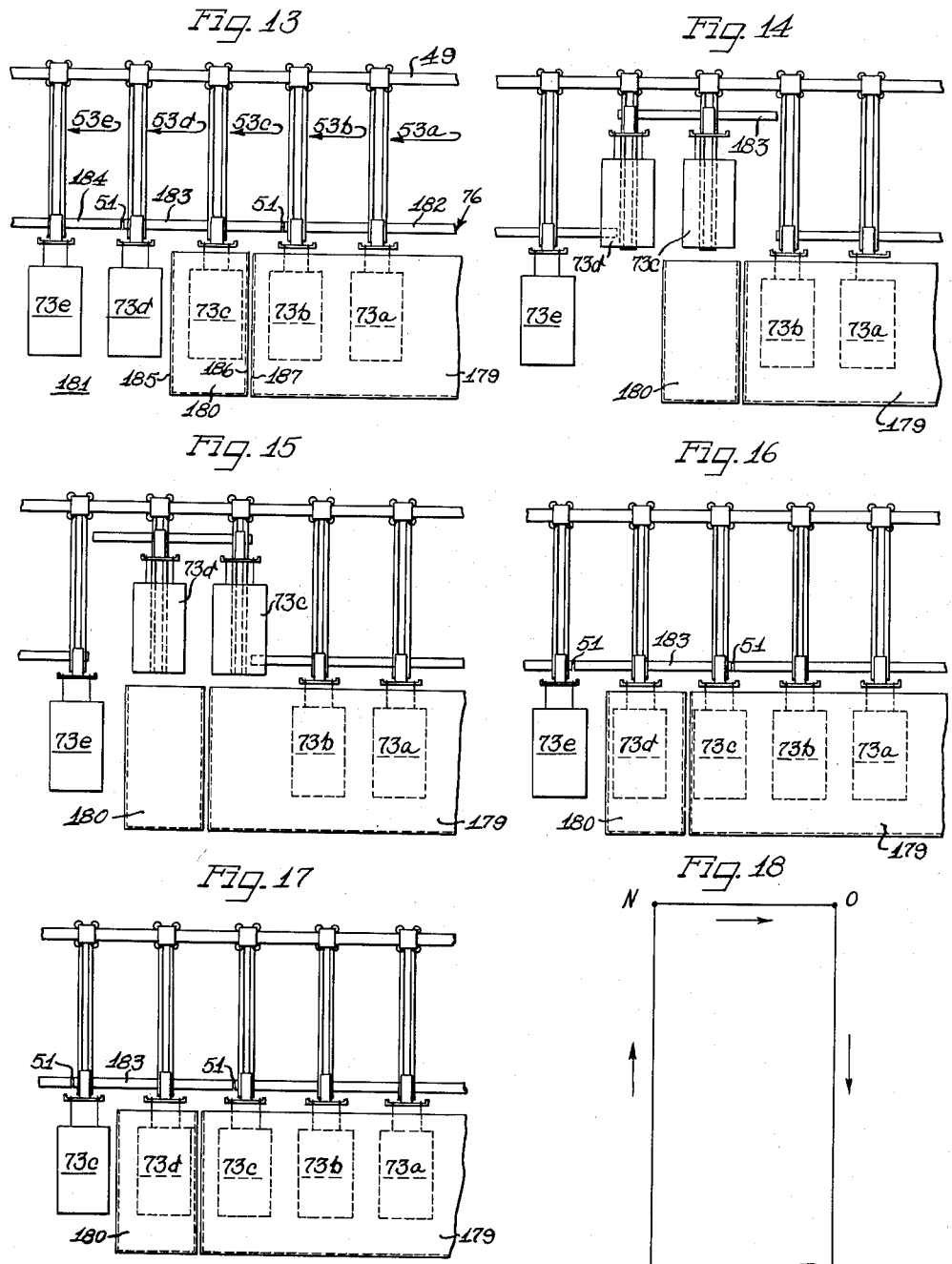

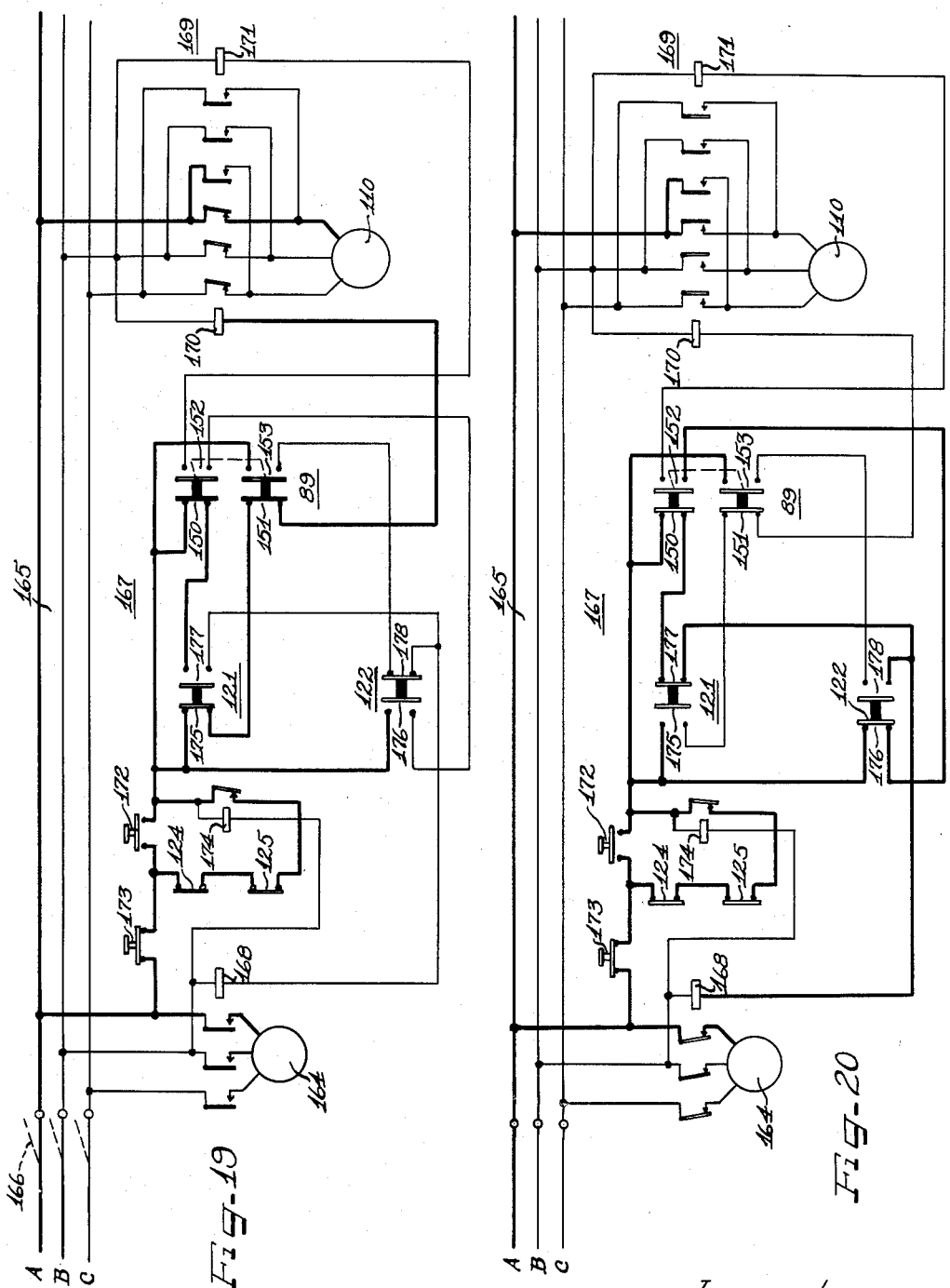

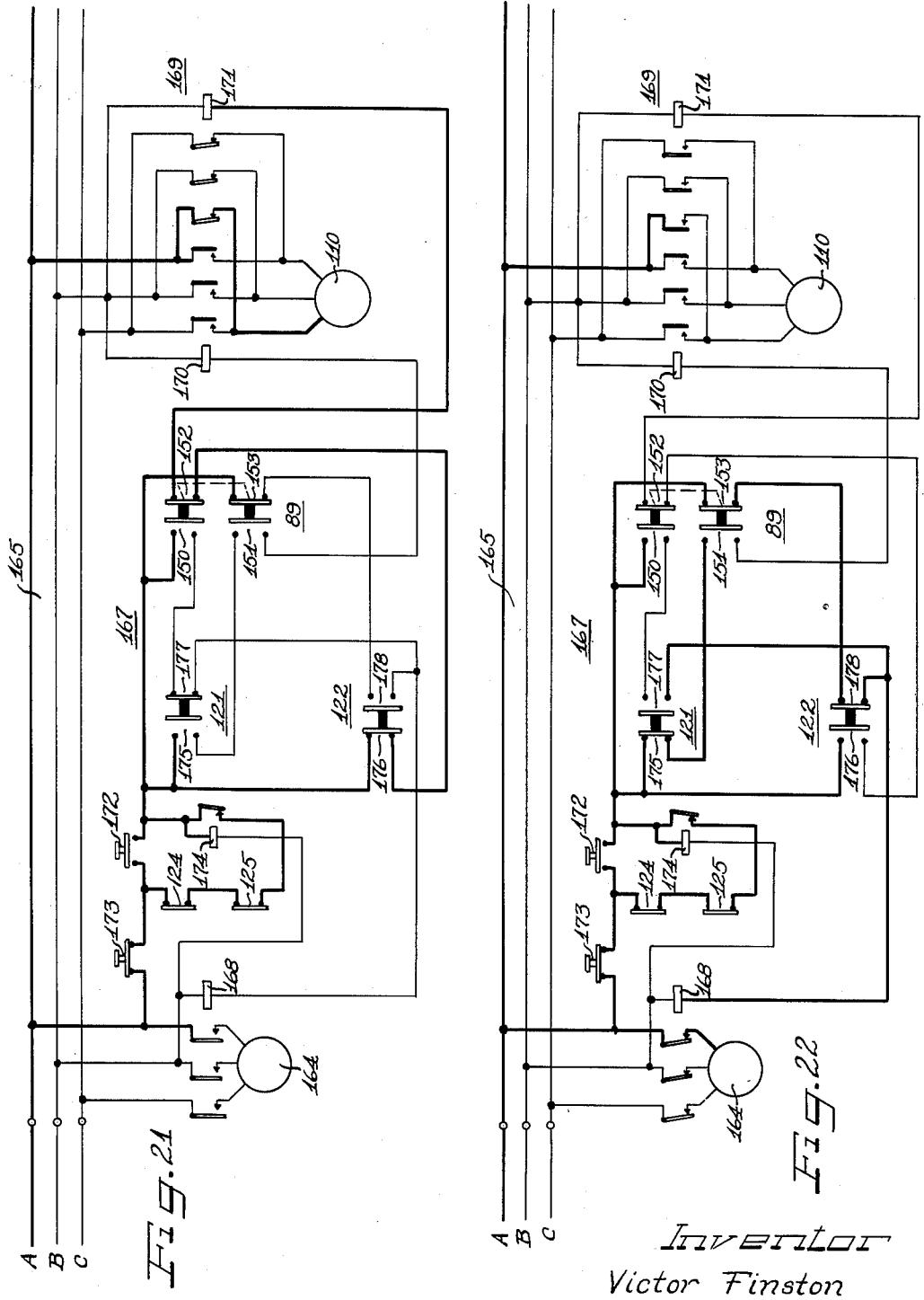

United States Patent Office 2,738,321
Patented Mar. 13, 1956

2,738,321

APPARATUS FOR AUTOMATICALLY CONVEYING AND IMMERSING ARTICLES

Victor Finston, Chicago, Ill., assignor to The Meaker Company, Chicago, Ill., a corporation of Illinois Application August 26, 1950, Serial No. 181,601

16 Claims. (Cl. 204—203)

This invention relates to electro-processing apparatus and, more particularly, to apparatus for automatically conveying and immersing articles in a series of electro-processing treatment baths.

It is an object of this invention to provide an electro-processing apparatus in which articles are carried horizontally through treatment baths, and are successively elevated for transfer between baths upon further horizontal movement.

It is a particular object of this invention to provide a fully automatic electro-processing apparatus in which a common elevator receives article carriers at the end of each treatment bath for contemporaneous transfer to the next following bath.

It is an object to provide means for conveying work carriers in an equally spaced apart relationship which is preserved irrespective of the position of the elevator.

A further object is to provide guides dependently supported from an overhead conveyor by which work holders are constrained to a vertical movement relative to the conveyor.

It is a further object of this invention to provide an automatic electro-processing apparatus with a conveyor and an elevator disposed to have a minimum of overhead height and controlled to advance article carriers a relatively short distance in rinse and dip baths and a relatively longer distance in electro-cleaning and plating baths.

It is a particular object of this invention to provide a sectional electrode rail offering sliding contact with a plurality of work holders and engageable with these holders to selectively support them in a raised position.

It is yet a further object to provide the rail with a plurality of movable sections for the transfer of articles between treatment baths, which sections are supported by a common frame to be raised and lowered contemporaneously.

It is an object of this invention to provide an electric control for alternately operating the conveyor and the elevator to raise and lower and intermittently advance a succession of articles by predetermined steps.

It is yet a further object of this invention to electrically control the actuation of the conveyor in accordance with the vertical position of the elevator and to control the actuation of the elevator to occur after a predetermined advance of the conveyor.

The specific nature of the invention as well as other objects and advantages thereof, will become apparent to those skilled in the art from the following detailed description of the annexed sheets of drawings which, by way of preferred example only, illustrate one specific embodiment of the invention.

On the drawings:

Figure 1 is a fragmentary plan view particularly illustrating the disposition of the conveyor chain above the treatment tanks.

Figure 2 is a side elevational view with the work pieces shown in their immersed position.

Figure 3 is a transverse, vertical, sectional view taken on the line III—III of Figure 2.

Figure 4 is a sectional view taken along the line IV—IV of Figure 2, illustrating particularly the relationship of the sectioned rail to the tanks disposed therebelow.

Figure 5 is a detailed plan view of a carriage and its associated switch actuating cam plate.

Figure 6 is an enlarged, broken front elevational view of a work carrier with its work holder shown dotted in raised position.

Figure 7 is a side elevational view of a work carrier with its work holder shown dotted in raised position.

Figure 13 is a fragmentary side elevational view of work carriers at a hypothetical work transfer station and in immersed position.

Figure 14 illustrates the work carriers of Figure 13 with the transfer section of rail in raised position.

Figure 15 is an illustration of the work carriers of Figure 14 after being advanced.

Figure 16 is an illustration of the carriers of Figure 15 with the transfer section of rail aligned with adjacent fixed sections of rail.

Figure 17 is an illustration of the work carriers of Figure 16 after being advanced to move one carrier from the transfer section to a fixed section.

Figure 18 is a diagrammatic illustration of the path of travel of a work holder in a vertical plane during one cycle of operation.

Figure 19 is a diagrammatic illustration of the control circuit with the elevator drive energized in elevating direction and the elevator in lowered position.

Figure 20 is a diagrammatic illustration of the control circuit with elevator drive energized in the lowering direction and the elevator in raised position.

Figure 21 is a diagrammatic illustration of the control circuit with elevator drive energized in the lowering direction and the elevator in raised position.

Figure 22 is a diagrammatic illustration of the control circuit with a conveyor drive energized and the elevator in lowered position.

As shown on the drawings:

Figure 10:
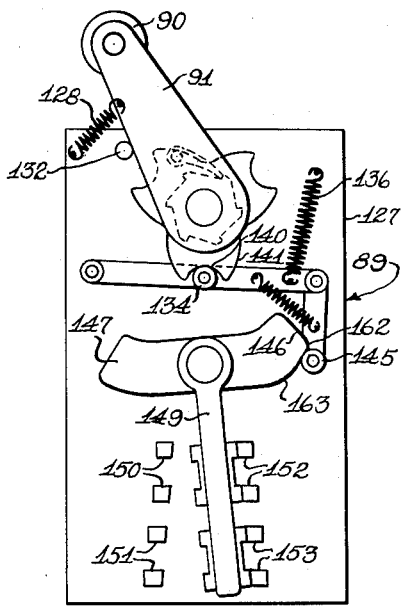
Figure 10 is a diagrammatic view of the conveyor limit switch after operation and in a second locked position.

Employing like characters to designate corresponding parts throughout, the apparatus includes tanks set upon a stationary frame work comprising transverse I-beams 31 and suitable longitudinal I-beams 32 positioned where required. The tanks (Figs. 1 and 4) stand adjacent one another, and in sequence, may be an electric cleaning tank 33, a rinse tank 34, an acid dip tank 35, a rinse tank 36, a cyanide dip tank 37, an electro-plating tank 38, a rinse tank 39, and a hot rinse tank 40. A loading station 41 and an unloading station 42 are conveniently located just before tank 33 and just after tank 40, respectively. Front and rear end partitions 43 and 44 for each of the tanks serve to separate adjacent tanks and to support electrode rails 45 extending longitudinally over tanks 33 and 38. Other sequences and other types of treatment baths may, of course, be employed, and the electrode rails disposed correspondingly.

The tanks are disposed in a U-shaped plan, and along the center line therebetween a number of vertical columns 46 (Fig. 3) extend well above the tanks. The upper ends of the columns are joined by girders 47 to which transverse angle irons 48 are secured. A mono-rail track 49 is supported centrally over the tanks by brackets 50 secured to the ends of the angle irons 48. The track is continued over the curved portion of tank 38 and supported there by the girders 47. The upper framework is completed correspondingly at its opposite end where the track 49 closes upon itself. The track thus extends continuously over the length of the tanks, the unloading station and the loading station.

The traveling work carriers 53 have carriages 54 in rolling engagement with the track 49. The collars 55 through which roller pins 56 extend to support upper and lower rollers 57 and 58, respectively, space the carrage plate 59 outwardly from the track 49 (as in Figure 7). Attached by bolts 60 to the inner face of the plate 59 are two parallel guide bars 61 in dependent relationship to the carriage 54. The vertical guideway formed by the guide bars 61 may be electrically insulated from the carriage by means of strips 62 and washers 63, with the bolt bore 64 through the carriage plate 59 of sufficient diameter to be spaced from contact with bolts 60. At the lowermost end of the guide bars 61, tie straps 65 are secured by bolts 66 to form a stop at the bottom of the guideway. In sliding confinement between the guide bars is a work holder 67 having lateral flanges 68 embracing the bars. The sliding shoe 69 of the holder is equipped at its upper end with a rail engaging roller 70, and at its lower end with a cross arm 71. The oppositely extending, T-shaped arms 72 which constitute the cross arm 71 are adapted to carry articles or work pieces 73 suspended from hooks 74 (as in Figure 3). The workpieces 73, as thus carried, are equally spaced from vertical planes passing through each of the three electrode rails 45. By this arrangement, a very uniform treatment of the work pieces may be obtained.

As may be seen in Figures 3 and 7, the weight of the work pieces on the work holder 67 is centered upon the guide bars 61, while the point of support for the work carriers is inwardly at the rollers 57. The force of gravity, therefore, creates a torque upon each work carrier which is resisted principally by the contact pressure of the sectional rail 76 exerted upon each shoe 69 at its surface 77. The rail 76, then, serves as a guide against lateral swinging and, as will be explained more fully hereafter, operates to raise and lower the work holders selectively and to transmit electric potential to the work holders for electro-processing treatments. In the latter capacity, the rail 76 operates as an electrode rail. In raising and lowering the work holders, the rail moves vertically to maintain its guiding contact with the work holders. The raised position of the work holder 67a and the engaging rail 76a are shown in dotted lines. A diminished frictional resistance to longitudinal movement of the carriers could be achieved by mounting a brush (not shown) in the place of surface 77 in a manner known in the art.

To advance the work carrier along the track 49, a member 78 is extended from the top of carriage plate 59 over the track to receive a pair of elongated chain pins 79a through spaced eyes 75 (as in Figure 5). Suitable means are provided for staying the chain pins 79a as, for example, cotter pins 80, while the continuous chain 81 is in turn retained upon the chain pins by means of their caps 82. It will be apparent that the weight of the chain 81 will be borne by the carriage and transmitted therefrom to the track 49. It will also be apparent that the work carriers will derive their longitudinal motion from the movement of the chain 81, with no relative longitudinal motion therebetween.

Figure 8:
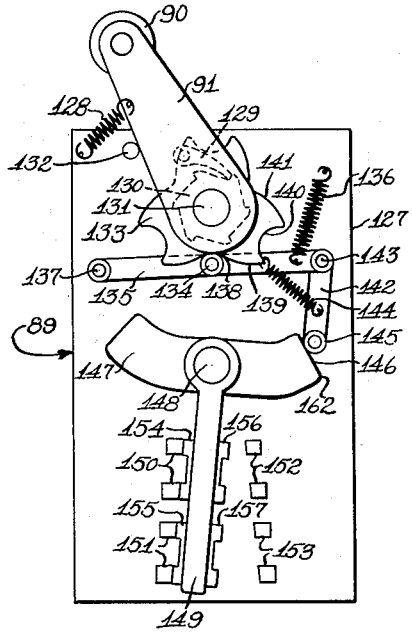
Figure 8 is a diagrammatic view of a conveyor limit switch in a first locked position.
Figure 9:
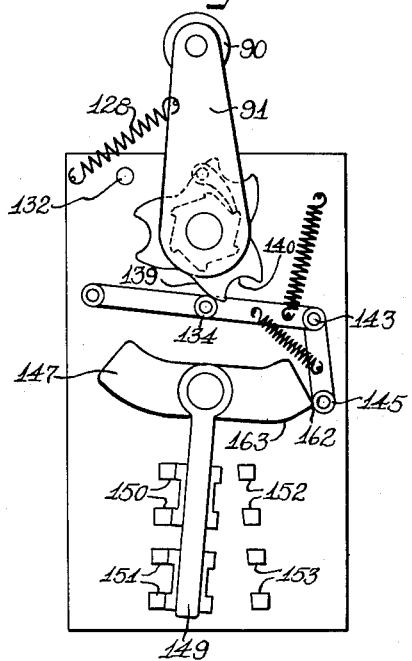
Figure 9 is a diagrammatic view showing the conveyor limit switch in a position just prior to operation.
Figure 11:
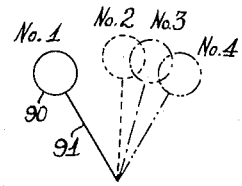
Figure 11 is a schematic view of the operation illustrated in Figures 8 through 10, inclusive.

The chain 81 may be of standard commercial design comprising links 83 joined together by chain pins 79 and rollers 84 mounted on the pins between adjoining sets of links. The chain rollers afford lateral guidance to the chain by making rolling contact with the inner face of the track 49. Upon either end of the upper stationary frame where the track is curved circularly, guide plates 85 are mounted to offer rolling contact with the chain rollers and to thereby conform the chain to the arc of the track. These guide plates 85 (as in Figure 1) will, in conforming the path of the chain to that of the track, relieve strain which would otherwise be imposed upon the carriages traveling the arc. At spaced intervals along the length of the continuous chain, elongated pins 79a are secured to member 78 and also to a switch actuating cam plate 86. This cam plate (shown in Figure 5) is shaped with a pair of teeth 87 and 88 projecting inwardly of the chain and toward the central axis of the apparatus. Referring back now to Figure 1, these spaced apart teeth 87 and 88 are seen to travel with the counterclockwise movement of the chain in a path which brings them into operating engagement with a switch 89 secured to a transverse beam 48 of the upper framework. As the plate 86 associated with each work carrier passes the switch 89, first tooth 87 and, then, tooth 88 operates the switch by contact with the follower wheel 90 on the bell-crank operating arm 91 (as seen in Figures 8, 9 and 10). The relationships between the work carriers, the switch actuating plates and the limit switch 89 and the operation of the limit switch itself will all be described more fully hereafter. It will be understood, however, that the actuation of the switch contributes to the indexing of movements of the work carriers as they are advanced over the tanks.

The chain drive 92 for the conveyor comprises a lug-carrying drive chain 93 carried by a pair of sprockets 94 to engage the chain from its inner side. A unidirectional electric motor 164, as in Figure 19, is suitably mounted and connected with the sprockets in a conventional manner, and electric power for the motor is supplied through a control circuit which will be discussed in greater detail hereafter.

Referring now to Figures 3 and 4, the mounting for the earlier mentioned sectional rail 76 is seen to comprise an intermediate stationary frame 95 for one portion of the rail and a vertically movable elevator frame 96 for another portion of the rail. The stationary frame includes longitudinal I-beams 97 and transverse I-beams 158 secured to the central columns 46. Along the outward ends of the transverse I-beams, a rail supporting beam 98 is strung, which includes at either end of the apparatus an arcuate portion corresponding to the arc of the track 49. To support the arcuate portions of beam 98, the stationary frame also includes bracing 99 at either end of the frame. The rail supporting beam 98 is not continuous around the entire tank circuit but continues intermittently in parallel relation to the fixed sections of rail 76 which will later be defined. The movable elevator frame 96 is similar to the stationary intermediate frame and consists of transverse I-beams 159 and longitudinal beams 100 supported for vertical reciprocation in part by a threaded collar member 101. Wheel mounts 102 secured to the transverse beams 159 carry wheels 103 in rolling contact with face plates 104 on either side of the central columns 46. Secured to the outer ends of the transverse beams 159 are substantially straight, rail-supporting beams 105.

The movable sections of rail 76, designated by the reference numerals 106a, 106b and 106c (Fig. 4), are disposed above the front and the rear end partitions 43 and 44 of the tanks, and extend continuously over the partitions associated with the rinse and dip tanks 34, 35, 36, 37, 39, and 40. Specifically, a movable loading section 106a extends from the loading platform 41 above the front end partition 43 of tank 33, so as to pass transversely through the vertically projected plane of this partition. The transfer section 106b extends from the end of tank 33 to the beginning of tank 38 to bridge the four short preparatory treatment tanks 34, 35, 36 and 37.

The third movable transfer section 106c extends from the end of tank 38 to the unloading platform 42, crossing over the two short rinsing tanks 39 and 40. The remainder of the rail 76 consists of three fixed sections 107a, 107b and 107c alternating with the movable sections. To support the movable rail sections, a number of rail brackets 108 secure the sections to the rail support beam 105 of the elevator. Similarly, rail brackets 109 are provided in spaced apart positions to hold the fixed rail sections, in spaced relationship to the beam 98. As shown in Figure 3, electrical insulation strips 108a and 109a isolate brackets 108 and 109, respectively, while cables 188 and 189 supply electrical potential thereto.

With the elevator in lowest position, the fixed and movable rail sections are in alignment, their abutting ends being suitably shaped, as by beveling, to present smooth cross-over junctions 51. It will be evident from an inspection of Figure 3 that the movable section of rail 76 is adapted upon elevation to engage flanged roller 70 to raise a holder 67. While in the lowered position, only surface 77 (Fig. 7) is in sliding contact with the sectional rail 76, in the raised position of the elevator 96a (illustrated in dotted lines in Fig. 3), there will be rolling contact between the roller 70 and the top surface of the rail 76, that is, rolling contact when the carrier is in motion. Thus, the movable rail sections serve as a lateral guide for the carriers and as an elevatable supporting track for the work holders. It is contemplated that with suitable electrical connections and insulation, the rail might also serve in the capacity of a cathode rail conducting a potential through its sliding contact with the carrier shoes 69. These connections 188 and 189 (Fig. 3) and the insulation 108a and 109a may be arranged in a conventional manner well known in the art.

To raise and lower the elevator frame, a reversible electric motor 110 (Fig. 2) supported on a pedestal 111 drives a main shaft 112 through a belt and sprocket connection 113. Adjacent each of the central columns 46 are torque of the main shaft 112 is transmitted through bevel gearing 114 to a threaded vertical shaft 115. Each threaded vertical shaft is supported between an upper bearing 116 (Fig. 3) and a lower thrust bearing 117, and along its threaded span passes through the similarly threaded collar member 101 of the elevator frame. As the threaded vertical shafts 115 are synchronized by their similar gear connections to the main shaft 112, the entire elevator frame will remain horizontal while being raised and lowered. In this regard, the spaced wheels 103 riding on the face plates of the central columns hold the elevator frame level in the direction of the transverse beams 159.

To diminish the expenditure of energy in raising the elevator frame, means for counterbalancing the frame are employed. In the illustrated embodiment (Fig. 2), pulley ropes 118 are secured at spaced intervals to the elevator frame 96 and are passed over sheaves 119 for attachment to counterweights 120. These counterweights may conveniently be disposed within the hollow interior of the central columns 46. The energization for elevator drive motor 110 is derived from a power control circuit to be described in detail hereafter.

Actuated by the approach of the elevator frame to its upper and lower limits of travel are upper and lower limit switches 121 and 122, respectively (Fig. 3). The upper switch 121 is supported in dependent relationship from the transverse beam 48 of the upper stationary frame, while the lower limit switch 122 is supported in upward position from the longitudinal I-beam 97 of the intermediate stationary frame. These limit switches are of the two-pole, double-throw type and assume a normal position when their actuating plunger 123 is extended and a reversed position only when the plunger is forced in. When the elevator frame is in its lowermost position, upper switch 121 is in normal position and lower switch 122 is in reversed position. As soon as the elevator is raised, switch 122 will return to its normal contact position, with the plunger extended. When the elevator frame reaches its uppermost position, indicated in dotted lines, limit switch 121 will be reversed and will remain reversed until the elevator frame is lowered. The functioning of these limit switches will be discussed in further detail in conjunction with the description of the control circuit. Likewise, the operation of the upper and lower safety switches 124 and 125 will then be elaborated upon. It may be noted at this time, however, that the plungers 126 of these safety switches will not be contacted unless the elevator frame moves beyond the operating positions for the limit switches 121 and 122. Both of these safety switches are of the single-pole, single-throw type and are normally closed except when actuated by overtravel of the elevator frame.

The formerly mentioned conveyor limit switch 89, which is positioned for actuation by the conveyor-carried cam plates 86, is more particularly described taking reference to Figures 8 through 12, inclusive. The switch comprises a housing 127 in which the bell-crank operating arm 91 is pivotally mounted, with spring 128 biasing it for counterclockwise rotation to an initial position No. 1. The cam follower roller 90 at the outer end of the arm 91 makes rolling contact with the cam plates 86 which, relative to the illustrated views, pass from left to right, parallelling the upper edge of the housing 127. When a tooth 87 strikes the roller 90, the arm 91 is forced to rotate in a counterclockwise direction imparting its motion through pawl 129 to the ratchet wheel 130, which is rotatively mounted on shaft 131 in common with the arm 91. It is to be noted that in actual operation, the arm 91 should take an initial position normal to the path of travel of the cam plates 86, rather than the illustrated position of approximately 30° counterclockwise from normal. The normal position is desirable in that the roller 90 will then ride more readily over the crest of the cam teeth 87 and 88 as the cam plate is advanced. The desired position would be obtained by a relative adjustment between arm 91 and shaft 131, and by advancing the position of stop pin 132 to prevent the return of the arm 91 be-beyond a position normal to the path of travel of the cam plate. The cam 133 is co-rotative with ratchet wheel 131 and is advanced therewith when the arm 91 rotates in a clockwise direction. The pawl and ratchet wheel arrangement, however, permits the arm to return to its initial position No. 1 independently of the cam and permit the cam to advance in a clockwise direction, when so urged, independently of the position of the arm. Cam follower 134 mounted on lever 135 is urged by a spring 136 about pivot 137 to ride upon the cam surface. The configuration of the cam surface embodies three cycles, each having a low dwell 138, a rising surface 139, a high dwell 140, and a falling surface 141. Thus, in Figure 8, the cam follower 134 is at the low dwell 138; in Figure 9, the cam follower is on the rising surface 139; and in Figure 10, the cam follower is in the high dwell 140. When the cam follower is at the low dwell (as in Figure 8), a second lever 142 pivoted at 143 to the first lever 135 and urged by spring 144 toward the lever 135 is in contact through its roller 145 with the lateral surface 146 of rocker 147. As the roller 145 transmits the force of spring 144 upon the surface 146 in a line normal to the surface and passing clockwise of the rocker pivot pin 148, the rocker 147 will rotate in a clockwise direction. The switch arm 149 carrying contact bars 154—155 and 156—157 in oppositely disposed sets, being co-rotatively secured to rocker 147, will swing to the left. Contacts 150 and 151 will then be closed through bars 154 and 155.

Figure 12:
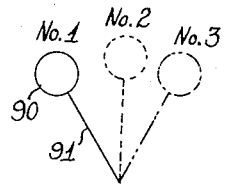
Figure 12 is a schematic view of the operation of the conveyor limit switch upon the next actuation following the operation illustrated in Figure 11.

Figure 9 illustrates the condition of switch 89 when a reversal is incipient. Cam follower 134 has been advanced by the movement of arm 91 up the rising cam surface 139 thereby forcing pivot 143 downwardly. The roller 145 forced downwardly by the motion of the pivot 143 is poised upon the cusp 162 beyond which reversal of the rocker and switch arm positions occurs. A very slight advance of the follower pin 134 upon the rising surface 139 will cause the roller 145 to pass around the cusp 162 and into contact with the arcuate surface 163 of the rocker. Contact with this surface 163 shifts the application of force to a direction conducive to counter-clockwise rotation of the rocker 147 and of the switch arm 149. It is, therefore, not necessary that follower pin 134 reach the high dwell 140 in order that reversal should occur. Figure 10 illustrates the locked position of the switch just reversed from the locked position of Figure 8. Follower pin 134 rests against the high dwell 140, and the roller 145 rests against the arcuate surface 163. For the attainment of this condition, the arm 91 was advanced clockwise beyond the normal position illustrated in Figure 9 to bring the high dwell of the cam 133 into contact with follower pin 134. Considering the initial position as No. 1, the incipient reversal position as No. 2, then the position of arm 91 necessary to lock the switch in reversed position would be No. 3. The arm 91 may be rotated yet further clockwise to a position No. 4 without causing a reversal of the switch. This additional movement of arm 91 permits the cam tooth 87 to pass by and out of contact with roller 90. When roller 90 is freed from the tooth, the arm will be drawn back by spring 128 against stop pin 132 to position No. 1. When the next succeeding cam tooth 88 engages wheel 90, the cam is advanced to bring the follower 134 upon the falling surface 141. Under the effort of follower spring 136, the follower will quickly advance the cam and fall to the low dwell 138. During this movement of the follower, the roller 145 will move past the cusp 162 and on to the lateral surface 146 to carry the switch arm into the position illustrated in Figure 8. Schematically, the positions taken by the wheel and arm of switch 89 through the stages represented by Figures 8, 9 and 10 are portrayed in Figure 11. The four positions numbered 1 through 4 have the above described significance. The symbol representing the switch is that used on the circuit diagram of Figures 19 through 22, inclusive, and indicates the contacts which are closed prior to operation of the switch. Figure 12 shows the three positions significant in the cycle of operation immediately following upon that illustrated in Figure 11. Position No. 1 is the starting position; position No. 2 is that when the follower enters upon the falling surface 141, whereupon the switch arm 149 swings to the left and locks in quick succession; and position No. 3 represents the extreme movement of the arm and roller permitting the cam tooth 88 to freely pass by. It will be understood that other switch mechanisms might equally well be employed and that the illustrated switch might readily be modified to be operated by the passage of cam teeth from right to left in the same manner that this illustrated embodiment is operated by a left to right passage. The illustrated switch is conveniently employed in the manner to be discussed more specifically in relation to the control circuit and the operation of this apparatus.

Making reference now to Figures 19 through 22 illustrating the control circuit at successive stages of the control cycle, both the elevator drive motor 110 and the conveyor drive motor 164 will be seen to derive power from a power line 165, which may be of 3-wire, 3-phase type. The energization of these motors is controlled by a main switch 166 and a control circuit, generally designated as 167. Conveyor drive motor 164 and reversible elevator drive motor 110 are seen to be connected in parallel to the phase lines, designated A, B, and C through conveyor drive relay 168 and elevator reversing relay 169 which includes "up" relay 170 and "down" relay 171. Referring particularly to Figure 19, a cycle of operation is initiated by closing the main switch 166 and momentarily closing the starting switch 172. Since stop switch 173 is normally closed, a connection will be completed between lines A and B to energize holding relay 174.

When start switch 172 returns to its normally open position, a connection will yet be had through elevator safety switches 124 and 125, which are normally closed, and through holding relay 174. The potential of line A is then applied to the lines of the control circuit shown in bold lines.

A hypothetical work transfer station has been illustrated in Figures 13 through 17, inclusive, for convenience in correlating work piece movements with the functioning of the control circuit 176. The hypothetical station represents a condensation of the tank circuit (Fig. 2) of the apparatus, and comprises an electro-processing tank 179, a dip tank 180, and a loading platform 181. Advancing to the right on the rail 49 are work carriers 53a, 53b, 53c, 53d, and 53e carrying respectively work pieces 73a, 79b, 73c, 73d, and 73e. The sectional electrode guide rail 76 is divided at the junctions 51 into fixed rail sections 182 and 184, and a movable rail section 183 therebetween. Considering the operating cycle to proceed in the numbered order of the figures, work piece 73d is to be transferred over partition 185, and work piece 73c is to be transferred over partitions 186 and 187. Their paths of transfer will lie in a vertical plane and take the form illustrated in Figure 18, starting from point M.

At the start of the operating cycle then, the transfer rail section 183 is in its lowered position and the normally closed contact 175 of switch 121 is closed, while the normally closed contact 176 of switch 122 is open. The switch arm 149 of switch 89 (as in Figure 8) is preset to the left, closing contacts 150 and 151. The "up" relay 170 is therewith connected across lines A and B to energize elevator drive motor 110 in the elevator raising direction. As the elevator frame 96 moves out of contact with the plunger 123 of switch 122, the normally closed contacts 176 are closed. When the elevator frame carries the transfer rail section to its raised position, switch 121 is operated to close its normally open contacts 177, disconnecting the "up" relay 170 and deenergizing motor 110. The transfer rail section 183 and the work pieces 73c and 73d are now positioned as in Figure 14. The circuit elements are disposed as in Figure 20 with the conveyor drive motor energized by the connection of relay 168 through closed contacts 150 and 177. The conveyor drive will advance the work carriers an interval slightly less than their interval of separation, represented as N-O on the transfer path, and equal to the distance between cam tooth 88 and the tooth 87 of the next following cam plate 86 (as seen in Figure 1). As this cam tooth 87 advances past the limit switch 89, it will operate to reverse the switch in the manner set forth above, closing contacts 152 and 153. Figure 21 illustrates the attained condition of the circuit and Figure 15 that of the work carriers. The "down" relay 171 now energizes the elevator drive motor 110 in elevator lowering direction. As the elevator frame leaves the elevator limit switch 121, contacts 175 are closed, work pieces 73c and 73d are immersed in the solutions of tanks 179 and 180, respectively, and then the elevator frame makes contact with lower limit switch 122. A circuit is established through contacts 153 and 178, picking up relay 168 to energize the conveyor drive motor 164. Work pieces 73c and 73e advance across rail section junctions 51 moving a distance P-Q on the transfer path, while the remaining work pieces advance a like increment in tanks 179 and 180. At the completion of the transfer cycle, their positions are as illustrated in Figure 17. The cam tooth 88 then operates conveyor limit switch 89 to halt the advance of the carriers at this position and to energize the control circuit (as in Figure 19) for a new cycle of operation. The rectilinear path of transfer of work pieces 73c and 73d thus comprises a vertical movement M-N, horizontal advance N-O, a lowering movement O-P, and a second horizontal advance P-Q. Since at the end of the cycle work piece 73d is positioned exactly as was work piece 73c at the beginning of the cycle, the horizontal distance M–Q equals the center-to-center distance separating work pieces 73c and 73d. As each of the work carriers is spaced at equal intervals by attachment at equal intervals to the conveyor chain 81, each succeeding work piece will follow the same path of transfer when it reaches a transfer station. In order that the rinse and dip tanks may be as short as possible, the work pieces are advanced through the very short interval P–Q when any of the work pieces are immersed in these tanks for rinsing or dipping. A greater advance occurs when the work pieces to be transferred are in raised position. By this advantageous arrangement, the length of travel in the electro-processing tanks is made as long as possible relative to the total length of the tanks.

This apparatus may readily be modified to accommodate various sized work pieces, to extend the treatment in one tank relative to another, to vary the sequence of treatment, to alter the spacing between carriers, to obtain various speeds of advance and elevation, and to operate in reverse direction by easy rearrangements of the tanks, carriers, fixed and movable rail sections, and the cam plates. It is conceived that braking devices might be applied to the conveyor and elevator drives to effectuate a prompt termination of vertical and horizontal movements. The comparatively light and simple construction of the elevator, including the transfer rail sections, facilitates the maintenance and reduces the overhead height of the apparatus. The manner of supporting the fixed rail sections in spaced relationship to support beam 98 conduces to the ready application of insulation and electric cables to supply electric power to the rail sections and thence to the work pieces for the electro-processing treatments. The manner of operation of the control circuit makes possible a rapid and automatic processing of many work pieces with accurate movements in both vertical and horizontal directions and with safeguards to protect the apparatus. The counterbalancing of the elevator affords a wide choice in the selection of an elevator drive by minimizing its required capacity.

Although a specific embodiment of the invention has been here illustrated and described, it will be understood that various modifications in the construction may be made without a departure from the spirit and scope of the invention as indicated by the appended claims.

I claim as my invention:

1. In an electroprocessing apparatus, a stationary framework including a plurality of support columns, an upper frame, a closed track supported thereon, an intermediate frame therebelow, a series of processing tanks arranged beneath said track, a counterbalanced elevator frame including guiding means for movably engaging said columns, elevator drive means carried on said framework for vertically moving said elevator frame, a plurality of work carriers, each including a carriage, upper and lower rollers on said carriage engaging upper and lower surfaces of said track to prevent pitching movement of said carriage, a pair of dependent spaced guide bars secured to said carriage outwardly of said track, a tie bar secured across the lower ends of said guide bars, and a work holder having a flanged shoe slidably confined between said guide bars and supportable on said tie bar and having like integral work carrying arms extending oppositely therefrom, a sectional guide rail extending along and above said tanks and spaced relative to said track to slidingly contact the shoes of said carriers at all times holding the guide bars vertical against a gravity bias, said rail having fixed sections carried by said intermediate frame and alternately thereof alined movable sections carried by said elevator frame, a roller carried by said shoes interengageable with said movable sections when the same are elevated above said fixed sections for movably supporting said work holders in raised position, a conveyor chain inwardly of said track, a conveyor drive means therefor, said carriages having chain supporting members extending over said track for attachment at equally spaced intervals to said chain, a cam plate carried by each of said members having spaced teeth extending inwardly of said chain, a control circuit for said elevator and said conveyor drive means including a conveyor limit switch carried by said upper frame and operated by said teeth moving therepast, an upper and a lower elevator limit switch carried on said framework and operated by said elevator frame moving thereagainst, said drives being alternately actuated by successive operations of said switches, and electrical means for supplying electrical current to said fixed rail sections for conduction to said shoes, said fixed rail sections and work holders being electrically conductive to supply current to work pieces carried by said work holders.

2. In an electro-processing apparatus, a stationary track, a plurality of work carriers supported solely by said track to depend therefrom, conveyor chain means attached to said carriers at equal intervals to move said carriers simultaneously along said track, a work holder for each of said carriers confined thereby for conjoint horizontal movement and for relative vertical reciprocation and having a roller projecting therefrom, a sectional rail extending parallel to and below said track and in lateral pressure contact with each work holder under the action of gravitational forces on said dependent carriers, said sectional rail including fixed electrode sections to carry electric potential to said work holders, and vertically reciprocable sections aligned with said fixed sections and engageable with the rollers of said work holders to raise the same independently of their horizontal movement with said carriers.

3. In an electroprocessing apparatus, a stationary framework including an upper frame, a track supported on said upper frame, an intermediate frame below said upper frame, a series of processing tanks arranged beneath said track, an elevator frame mounted for vertical reciprocation on said framework, elevator drive means carried on said framework for vertically moving said elevator frame, a plurality of work carriers, each including a carriage engaging said track and movable therealong, a guideway secured to said carriage outwardly of said track and depending therefrom, a work holder vertically movable in said guideway and including a shoe, a sectional guide rail extending along and above said tanks and in sliding contacting relation to the shoes of the carriers and at all times holding the guideway vertical against a gravity bias, said rail having fixed sections carried by said intermediate frame and aligned movable sections carried by said elevator frame, a roller carried by said work holder interengageable with said movable sections when the same are elevated above said fixed sections for movably supporting said work holders in raised position, and electrical means for supplying electrical current to said fixed rail sections for conduction to said shoes, said fixed rail sections and said work holders being electrically conductive to supply current to work pieces carried by said work holders.

4. In an electroprocessing apparatus, a stationary framework including an upper frame, a track supported on said upper frame, a series of processing tanks arranged beneath said track, an elevator frame mounted for vertical reciprocation on said framework, elevator drive means carried on said framework for vertically moving said elevator frame, a plurality of work carriers, each including a carriage engaging said track and movable therealong, a guideway secured to said carriage outwardly of said track and depending therefrom, a work holder vertically movable in said guideway and including a shoe, a guide rail extending along and above said tanks and in sliding contacting relation to the shoes of the carriers and at all times holding the guideway vertical against a gravity bias, said rail being carried by said elevator frame, and a roller carried by said work holder and interengageable with said rail when the same is elevated for movably supporting said work holders in raised position.

5. In an electroprocessing apparatus, a stationary framework including an upper frame, a track supported on said upper frame, an intermediate frame below said upper frame, a series of processing tanks arranged beneath said track, an elevator frame mounted for vertical reciprocation on said framework, elevator drive means carried on said framework for vertically moving said elevator frame, a plurality of work carriers, each including a carriage engaging said track and movable therealong, a guideway secured to said carriage and depending therefrom, a work holder vertically movable in said guideway and including a shoe, a sectional guide rail extending along and above said tanks and in sliding contacting relation to the shoes of the carriers, said sectional guide rail having fixed sections carried by said intermediate frame and aligned movable sections carried by said elevator frame, a roller carried by said work holder and interengageable with said movable sections when the same are elevated above said fixed sections for movably supporting said work holders in raised position, and electrical means for supplying electrical current to said fixed rail sections for conduction to said shoes, said fixed rail sections and said work holders being electrically conductive to supply current to work pieces carried by said work holders.

6. In an electroprocessing apparatus, a stationary framework including an upper frame, a track supported on said upper frame, a series of processing tanks arranged beneath said track, an elevator frame mounted for vertical movement on said framework, elevator drive means carried on said framework for vertically moving said elevator frame, a plurality of work carriers, each including a carriage engaging said track and movable therealong, a guideway secured to said carriage and depending therefrom, a work holder vertically movable in said guideway and including a shoe, a guide rail extending along and above said tanks and in sliding contacting relation to the shoes of the carriers, said rail being carried by said elevator frame, and a roller carried by said work holder and interengageable with said rail when the same is elevated for movably supporting said work holders in raised position.

7. In an electroprocessing apparatus, a stationary framework including an upper frame, a track supported on said upper frame, a series of processing tanks arranged beneath said track, an elevator frame mounted for vertical movement on said framework, elevator drive means carried on said framework for vertically moving said elevator frame, a plurality of work carriers, each of said work carriers including a carriage engaging said track and movable therealong, a guideway secured to said carriage and including spaced vertically extending guide bars suspended from said carriage, a work holder having a flanged shoe slidably confined between said guide bars and in electrical contact with said guide bars, a guide rail extending along and above said tanks and in sliding contacting relation to the shoes of the carriers, said rail being carried by said elevator frame, and a roller carried by said work holder and interengageable with said rail when the same is elevated for movably supporting said work holders in raised position, and electrical means for supplying electrical current to said rail for conduction to said shoes, said rail and said work holders being electrically conductive to supply current to work pieces carried by said work holders.

8. In an electroprocessing apparatus, a stationary framework including an upper frame, a series of processing tanks arranged beneath said frame, a track supported on said upper frame above said tanks, an elevator frame mounted for vertical reciprocation on said framework, elevator drive means carried on said framework for vertically moving said elevator frame, a plurality of work carriers, each of said work carriers including a carriage engaging said track and movable therealong, a guideway secured to said carriage and suspended therefrom, a work holder vertically movable in said guideway and including a shoe having a vertical contact face, a guide rail extending along and above said tanks and having an elongated vertical contact face engaging said shoe vertical contact face to maintain the work carrier center of gravity horizontally offset from the point of suspension of said work carrier for face-to-face sliding contact between the respective contact faces of the shoe and rail, said rail having an upper free edge, a roller carried by said work holder and interengageable with said rail upper free edge, and said rail being carried by said elevator frame, said elevator drive means being operative to elevate said work holder by means of said rail, and said rail movably supporting said work holder by means of said roller.

9. In an apparatus for conveying work through a series of treatment baths, an elongated horizontally disposed conveyor extending above said baths and movable longitudinally, a conveyor motor for advancing said conveyor, work carriers attached to said conveyor for movement in unison with said conveyor, a work carrying member attached to each of said carriers and mounted for vertical movement relative thereto, elevator means disposed for engagement with said members to move the members vertically, an elevator drive motor connected with said elevator means for moving the same vertically, upper and lower limit switches actuated by said elevator means in upper and lower positions thereof respectively, a first series of cams attached to said conveyor means at spaced intervals and movable with said conveyor, a second series of cams attached to said conveyor means in alternating relation to said first series of cams and movable with said conveyor, stationary conveyor switch means disposed adjacent said conveyor for successive actuation by said cams and biased to return to initial position after each actuation, an elevator up relay controlling the energizing circuit for said elevator motor and in turn having an actuating circuit controlled by a pair of normally closed contacts of said upper limit switch, said elevator in upper position actuating said upper limit switch to open said normally closed contacts thereof and to deenergize said elevator motor, a conveyor relay controlling energization of said conveyor motor and having an actuating circuit controlled by a pair of normally opened contacts of said upper limit switch and by a pair of normally closed contacts of said conveyor switch, said conveyor motor being energized when said elevator means reaches upper position, and said conveyor switch means being actuated as a cam of said first series is advanced past said conveyor switch means by said conveyor to open said normally closed contacts of said conveyor switch means to deenergize said conveyor motor, an elevator down relay controlling the energizing circuit for said elevator drive motor in the down direction and having an actuating circuit controlled by a pair of normally closed contacts of said lower limit switch and by a pair of normally opened contacts of said conveyor switch, said elevator means being actuated to lower said work carrying member upon actuation of said conveyor switch means, and the elevator means actuating said lower limit switch to open its normally closed contact to deenergize the conveyor motor in lower position of said elevator means, said conveyor motor relay having an actuating circuit controlled by a pair of normally opened contacts of said lower limit switch and by a pair of normally open contacts of said conveyor switch, and a cam of said second series actuating said conveyor switch means to deenergize said conveyor motor upon predetermined advance of said conveyor, and the closure of the normally closed contacts of the conveyor switch means by the restoring action of the cam of the second series initiating the energization of the elevator up relay to begin a new cycle.

10. In an electroprocessing apparatus, a stationary track having upper and lower free edges, a conveyor chain extending adjacent said track on one side thereof, a plurality of carriages attached to said conveyor chain at spaced points therealong and disposed on the opposite side of said track, upper and lower sets of rollers secured to each of said carriages and engaging said upper and lower edges of said track, respectively, each set of said rollers engaging said track at plural points therealong to insure movement of said carriages therealong without pitching, the upper rollers having flanges on the conveyor side of said track and the lower rollers having flanges on the carriage side of said track to limit lateral movement of said rollers, a guideway secured in dependent relation to each of said carriages, a work holder slidably confined by each guideway and having a center of gravity laterally offset from said points of engagement of said rollers on said track, and a guide rail coextending in generally parallel relation beneath said track and so positioned relative thereto as to be in lateral pressure contact with said work holders under the action of gravitational forces on said work holders.

11. In an electroprocessing apparatus, work conveying and elevating mechanism comprising a track, work carriers supported by and movable over said track, a generally horizontal endless traveling conveyor to which said work carriers are attached at spaced intervals, generally vertical guideways dependently suspended from said carriers, workholders movable in said guideways and supported thereby at their lowermost position, a generally horizontal sectional rail having fixed and vertically movable sections against which said holders are gravitationally biased to establish lateral sliding contact therebetween, said movable sections and said workholders having portions that interengage when said movable rail sections are elevated, means for elevating said movable rail sections and means for driving said conveyor and control means for sequentially operating said elevating means and said driving means to move said workholders through a predetermined path while at all times in contact with said rail.

12. In a processing apparatus for treating a series of uniformly spaced work units by immersion in a series of tanks, a first tank having a longitudinal extent less than the spacing between work units, a second tank having a relatively greater longitudinal extent and in longitudinally aligned adjacent relation to said first tank, a framework, an elevator frame mounted on said framework for vertical reciprocation, a rail carried by said frame for movement from a lowered to an elevated position, elevator means for raising and lowering said elevator frame to move said rail between lowered and elevated positions, means for supporting work units immersed in said first and second tanks including first and second work holders spaced a predetermined longitudinal distance apart and having portions that are supported by and movable along said rail when said rail is in elevated position, said rail extending longitudinally along said first tank and projecting longitudinally beyond said first tank to overhang said second tank, the length of overhang of said rail over said second tank being correlated with the effective longitudinal extent of the first tank so that equal movement of a first work holder having work in said first tank and of a second work holder having work in said second tank results in movement of said second work holder portion longitudinally beyond the end of the rail over said second tank, means for simultaneously advancing said first and second work holders having work in said first and second tanks respectively an equal distance longitudinally less than said predetermined distance between said first and second work holders to move the work of the first work holder to the end of said first tank adjacent said second tank and to move said portion of said second work holder longitudinally beyond the end of said rail overhanging said second tank, control means for thereafter causing the elevator means to raise said rail to elevated position with the work of said first work holder supported by said rail above said tanks, means for thereafter advancing said first work holder along said rail a distance equal to said predetermined distance between work holders to move the first work holder to a position over the second tank, and control means for causing said rail to be lowered to immerse the work carried by said first work holder in said second tank.

13. In an electroprocessing apparatus for immersing work in a series of tanks, a first tank of a relatively short longitudinal extent and a second tank of a relatively greater longitudinal extent and longitudinally aligned with said first tank and adjacent thereto, a continuous rail extending longitudinally adjacent said tanks, a framework adjacent said tanks, an elevator frame mounted on said framework for vertical reciprocation and carrying said rail, elevator means for raising and lowering said elevator frame to raise and lower said rail, means for conveying work to said first tank and between said first tank and said second tank including work holders having portions that interengage with said rail when vertically aligned therewith and the rail is elevated, said rail in upper position thereof supporting said work holders engaged therewith for movement along said rail with the work carried by said work holders clearing said tanks, said rail projecting longitudinally beyond said first tank in the direction away from said second tank a distance sufficient to receive a work holder in lower position of the rail with the work carried by the work holder at the level of said first tank but spaced horizontally therefrom, said rail extending across said first tank and extending longitudinally over said second tank a distance sufficient to accommodate a single work holder with work immersed in said second tank, the length of overhang of said rail over said second tank being correlated with the effective length of said first tank so that equal movement of a first work holder having work in said first tank and of a second work holder having work in said second tank results in movement of said second work holder beyond the end of said rail adjacent said second tank, means for advancing said work holders onto the end of said rail remote from said second tank, means for advancing work holders along said rail in lower position of the rail a distance equal to the effective length of said first tank, means for advancing said work holders horizontally along said rail when the rail is in upper position a distance to transfer a first work holder from the end of said rail remote from said second tank to a position overlying said first tank and for moving a second holder from a position along said rail overlying said first tank to the end of the rail overlying said second tank, and control means for sequentially operating said elevating means and said advancing means to advance a first work holder into engageable relation with the end of said rail remote from said second tank, for elevating said rail to upper position, for advancing said first work holder along said rail to overlie the end of said first tank remote from said second tank, to lower said rail to immerse the work of said first work holder in said first tank, to advance a second work holder onto the remote end of said rail and simultaneously to advance the first work holder to the end of said first tank adjacent said second tank, to again elevate said rail to upper position, to advance said first and second work holders to overlie the first tank and second tank respectively, to lower said rail to a lower position to immerse the work of the first and second work holders, to advance a third work holder onto the end of said rail remote from said second tank and simultaneously to advance said second work holder to the end of said first tank and simultaneously to advance said first carrier out of engageable relation with said rail, and then to elevate said rail to elevate said second and third work holders for advance to the second and first tanks respectively.

14. In an electroprocessing machine for treating work units of a predetermined longitudinal extent, a cleaning bath of effective length less than twice the extent of a work unit, a plating bath of effective length greater than twice the extent of a work unit, means for supporting and advancing work relative to said bath including vertically reciprocal work holders each for supporting a work unit, conveyor means connected with said work holders for horizontally advancing said holders, elevator means engageable with said holders for raising and lowering said holders, drive means for actuating said conveyor means to advance said work holders and for energizing said elevator means to raise and lower said holders, said cleaning bath accommodating longitudinal movement of a work unit therein a first predetermined distance less than the longitudinal extent of a work unit, said conveyor means being operable to alternately advance work units said first predetermined distance and a second predetermined distance greater than the longitudinal extent of a work unit, and control means including switches in the paths of said conveyor means and said elevator means to actuate sequentially and cyclically the conveyor means for a relatively short advance equal to said first predetermined distance, the elevator means in elevating direction to raise the work units above said baths, the conveyor means for a relatively long distance equal to said second predetermined distance for moving a work unit over the partitions between the cleaning and plating baths, and the elevator means in lowering direction to immerse the work units in the plating bath.

15. In a processing machine for immersing work units in a series of tanks, a first tank, a second tank longitudinally aligned with and adjacent said first tank for receiving work units after treatment in said first tank, an elongated rail extending longitudinally along said first tank and across the adjacent ends of the first and second tanks with one end of the rail extending adjacent the longitudinal portion of said second tank closest to said first tank, a framework, an elevator frame mounted on said framework for vertical reciprocation and carrying said rail, elevator drive means for raising and lowering said elevator frame to move said rail between said upper and lower positions, a work carrier having a work unit immersed in said first tank and having a portion thereof overlying said rail for interengagement therewith and support thereby upon raising of said rail, said work carrier portion being movable along said rail in upper position of the rail with the work of the work carrier at a level to clear the adjacent ends of said first and second tanks, conveyor means operative in upper position of said work carrier to advance said work carrier along said rail a first predetermined distance to move the work unit supported by said carrier from a position over said first tank to a position over said second tank, conveyor drive means for advancing said conveyor means, said elevator drive means being operative to lower said rail to immerse the work unit of said work carrier in said second tank, said conveyor means being operative in lower position of said work carrier in said second tank to advance said work carrier a second predetermined distance sufficient to move said portion of said work carrier beyond said one end of said rail but substantially less than said first predetermined distance, and control means for cyclically and sequentially energizing said elevator drive means to raise said rail, then said conveyor drive means to advance work units said first predetermined distance, then said elevator drive means to lower said rail, and then said conveyor drive means to advance said work units said second predetermined distance.

16. In a processing machine for immersing work units in a series of treatment tanks, a treatment tank having an end wall at one longitudinal end thereof, an elongated rail extending longitudinally adjacent said tank and having one end thereof extending longitudinally to a point in front of said end wall, a framework, an elevator frame mounted on said framework for vertical reciprocation and carrying said rail, elevator drive means for raising and lowering said elevator frames to move said rail between upper and lower positions, a work carrier in front of said one end of said rail and having a portion thereof at a level above and longitudinally aligned with the lower position of the rail for movement into overlying interengageable relation to said rail upon longitudinal advance thereof a first predetermined distance with the rail in lower position, conveyor means for advancing said work carrier, conveyor drive means operable to advance said conveyor means said first predetermined distance, said elevator drive means being operable to raise said rail to move said work carrier to an upper position with the work unit carried thereby above the level of said end wall of said tank, said portion of said work carrier being supported by said rail and being movable along said rail in upper position of the rail, said conveyor means being operable in upper position of said work carrier to advance said work carrier along said rail a second predetermined longitudinal distance substantially greater than said first predetermined distance to move the work unit of said work carrier into overlying relation to said tank, said elevator drive means then being operable to lower said rail to immerse the work unit of said work carrier in said tank, and control means for cyclically and sequentially energizing said conveyor drive means to advance work units said first predetermined distance, then said elevator drive means to raise said rail, then said conveyor drive means to advance work units said second predetermined distance, and then said elevator drive means to lower said rail.

References Cited in the file of this patent

UNITED STATES PATENTS

| | | |
|---|---|---|
| 579,124 | Bossard | Mar. 23, 1897 |
| 679,357 | Betts | July 30, 1901 |
| 1,318,053 | Davoran | Oct. 7, 1919 |
| 1,531,782 | Hamilton | Mar. 31, 1925 |
| 1,613,878 | Emard | Jan. 11, 1927 |
| 2,182,184 | Todd | Dec. 5, 1939 |
| 2,341,606 | Finston | Feb. 15, 1944 |
| 2,461,113 | Friedman | Feb. 8, 1949 |
| 2,479,322 | Davis | Aug. 16, 1949 |
| 2,626,621 | Curtis | Jan. 27, 1953 |